(No Model.)

F. L. McGAHAN.
PIPE COUPLING.

No. 331,806. Patented Dec. 8, 1885.

WITNESSES:
V. M. Hood.
Frank A. Jacob

INVENTOR:
Fred L. McGahan
By H. P. Hood
Atty.

UNITED STATES PATENT OFFICE.

FRED L. McGAHAN, OF INDIANAPOLIS, INDIANA.

PIPE-COUPLING.

SPECIFICATION forming part of Letters Patent No. 331,806, dated December 8, 1885.

Application filed January 26, 1885. Serial No. 153,975. (No model.)

*To all whom it may concern:*

Be it known that I, FRED L. McGAHAN, a citizen of the United States, residing at Indianapolis, in the county of Marion and State of Indiana, have invented a new and useful Improvement in Pipe-Couplings, of which the following is a specification.

My invention relates to an improvement in that class of pipe-couplings which form steam-tight swivel-connections in steam-pipes, whereby a steam-blast flue-cleaner or like device is flexibly connected with a source of steam-supply.

The object of my improvement is to provide a novel means for securing in place and making tight the swiveled portion having a quarter-turn thereon, all as hereinafter fully described.

The accompanying drawings illustrate my invention.

Figure 2:
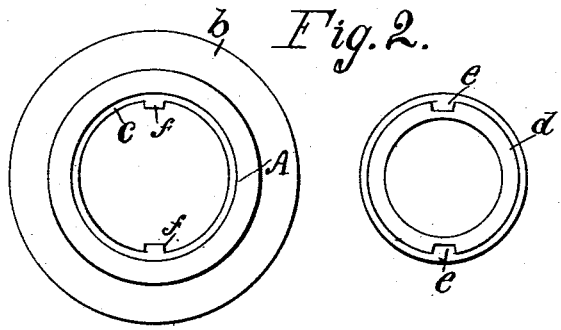
Figure 1:
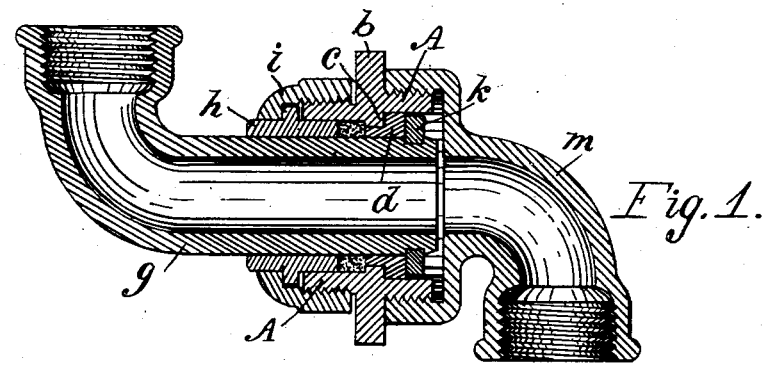
Figure 3:
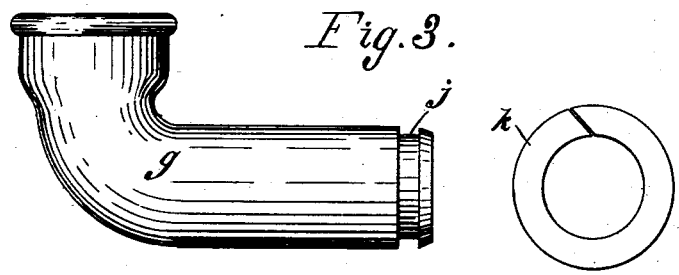

Figure 1 represents a longitudinal section of the complete coupling. Fig. 2 is a plan of the central portion of the coupling and the removable bearing. Fig. 3 is a view of the quarter-turn swivel and its retaining-ring detached therefrom.

A is a short cylinder, threaded externally at both ends, and having an outside central flange, $b$, and an inside shoulder, $c$.

$d$ is an annular bearing tightly fitting the interior of cylinder A. Said bearing rests against the shoulder $c$, and for the purpose of preventing any possibility of the bearing turning it is provided with recesses $e$, which engage corresponding projections, $f$, on the inside of cylinder A.

$g$ is a short tube, having an elbow formed at one end, which is threaded on its interior to receive one of the sections of steam-pipe to be coupled.

$h$ is a gland, held in place by a screw-cap, $i$, and forming with one end of cylinder A a stuffing-box, through which tube $g$ passes, fitting so as to be practically steam-tight, but capable of turning easily therein. Tube $g$ also passes through and fits nicely within the bearing $d$.

For the purpose of retaining tube $g$ in the coupling, a shallow groove, $j$, Fig. 3, is made in the end of the tube, and the tube having been thrust through the coupling, so as to project beyond cylinder A, a cut ring, $k$, having an interior diameter corresponding to the diameter of the tube at the bottom of the groove $j$, is slipped over the end of the tube and into the groove $j$, thus forming a collar which engages bearing $d$ and prevents the withdrawal of the tube.

The meeting-surfaces of bearings $d$ and $k$ are ground together and form a steam-tight joint.

$m$ is an elbow, screw-threaded at one end to receive the end of cylinder A, and threaded at the opposite end to receive the other section of the pipe to be coupled.

In this class of couplings as heretofore constructed that portion corresponding to bearing $d$ has been formed integral with the cylinder A, and being subjected to considerable wear, the fit between it and the tube passing through it is soon destroyed, and the coupling leaks and must be replaced with a new coupling. In my device this waste is avoided by removing bearing $d$ and replacing it only with a new one.

When tube $g$ is made straight and the elbow made in a separate piece, as is usual, the retaining-collar has been made integral therewith; but for the purposes of strength and compactness I find it desirable to form the elbow on the tube, and as the elbow will not pass through the coupling, the collar is formed separately and applied as described.

I claim as my invention—

The combination, with cylinder A, having an interior annular bearing, gland $h$, screw-cap $i$, and elbow $m$, of tube $g$, adapted to rotate and slide longitudinally within said gland and interior bearing, and having groove $j$ and removable ring $k$, all substantially as and for the purpose specified.

FRED L. McGAHAN.

Witnesses:
G. W. WARREN,
H. P. HOOD.